United States Patent [19]

Swinderman

[11] Patent Number: 4,826,118
[45] Date of Patent: May 2, 1989

[54] SUPPORT FOR AN APPLIANCE LEG OR THE LIKE

[75] Inventor: William J. Swinderman, Vandalia, Ohio

[73] Assignee: Hobart Corporation, Troy, Ohio

[21] Appl. No.: 163,904

[22] Filed: Mar. 3, 1988

[51] Int. Cl.$^4$ ............................................. F16M 11/24
[52] U.S. Cl. ............................... 248/188.9; 248/188.4
[58] Field of Search .............. 248/188.2, 188.4, 188.5, 248/656, 188.9, 188.8; 182/141, 204, 201, 202; 312/255, 256

[56] References Cited

U.S. PATENT DOCUMENTS

| | | | |
|---|---|---|---|
| 341,481 | 5/1886 | Himes | 248/188.4 |
| 599,333 | 2/1898 | Hulse | 248/188.8 |
| 1,159,570 | 11/1915 | Clark | 248/188.8 |
| 3,071,887 | 1/1963 | Arb | 248/188.4 X |
| 3,356,327 | 12/1967 | Schreyer | 248/188.8 X |
| 3,954,241 | 5/1976 | Carlson | 248/188.8 X |
| 4,368,869 | 1/1983 | Gelvezon | 248/656 |
| 4,461,491 | 7/1984 | Eklund | 248/188.8 X |

*Primary Examiner*—J. Franklin Foss
*Attorney, Agent, or Firm*—Russell L. McIlwain

[57] ABSTRACT

A support for an appliance leg or the like, wherein the appliance includes a frame member to which an adjustable leg is attached, comprises a generally elongate base member having a relatively flat center portion and two upturned distal end portions. Guide means are connected to the center portion of the base member for suspending the base member in floating fashion from the frame member. Anti-friction means are secured to the underside of the base member for sliding contact with a floor. The support is installed to the frame member beneath a typical adjustable appliance leg such that the pad of the leg bears on the center portion of the base member. As so installed the support provides essentially a skid which allows for the ready adjustment of the leg while permitting the appliance to be freely moved across uneven or tiled floor surfaces.

5 Claims, 1 Drawing Sheet

SUPPORT FOR AN APPLIANCE LEG OR THE LIKE

BACKGROUND OF THE INVENTION

1. Field of the Invention

The present invention relates generally to an improved support for the leg of an appliance or the like, and it relates more particularly to a support which permits an appliance leg to slide unobstructedly across an uneven or tiled floor surface.

2. Description of the Prior Art

Appliances of various types are used in commercial and institutional restaurants for such tasks as cooling, baking and dish washing, for example. Typically, these appliances are supported on a plurality of legs. A common appliance leg comprises a disc-like pad member secured to a shaft which is threadedly received by the frame of the appliance. Threaded attachment of the leg permits manual adjustment to be made of the height of the pad when it is desired to level the appliance on an uneven floor.

It is fairly common for the floor of a commercial or institutional kitchen to be covered with quarry tile having grout lines separating the tile squares. The grout lines are often depressed below the surface of the tile posing an obstruction to the free movement of an appliance leg across the floor. While conventional appliance legs permit the convenient movement of an appliance across a smooth floor, on a tile floor, because of their small surface area, they tend to catch the tile edges, making it impossible to slide the appliance without lifting or forcing it. Accordingly, it would be desirable to provide a support for an appliance leg having an increased area, reduced-friction surface which permits the appliance to be freely moved on a quarry tile floor. It would be further desirable to provide an appliance leg support which is conveniently attachable to the appliance and is cooperable with the appliance leg to level the appliance.

SUMMARY OF THE INVENTION

Briefly, there is provided in accordance with the teachings of the present invention a new support for a leg of an appliance comprising a generally elongate base member having a center portion and two distal end portions. The distal end portions are upturned relative to the center portion. A pair of guide posts extend generally at right angles to the center portion. The guide posts are receivable within apertures provided in the frame of the appliance. The apertures are located on opposite sides of the appliance leg such that when the support is installed, the pad of the leg bears against the center portion of the base member. Anti-friction means in the form of a polyethylene strip, for example, is secured to the underside of the base member. As so configured, the support provides essentially a runner which is capable of gliding over the cracks or other discontinuities in a floor. Since the appliance leg is readily accessible when resting on the support, the support does not interfere with manual adjustment of the leg member when leveling of the appliance is desired.

BRIEF DESCRIPTION OF THE DRAWINGS

The foregoing and other novel features of the present invention will be better understood by a reading of the following detailed description taken in connection with the accompanying drawings wherein.

DETAILED DESCRIPTION OF THE INVENTION

Figure 1:
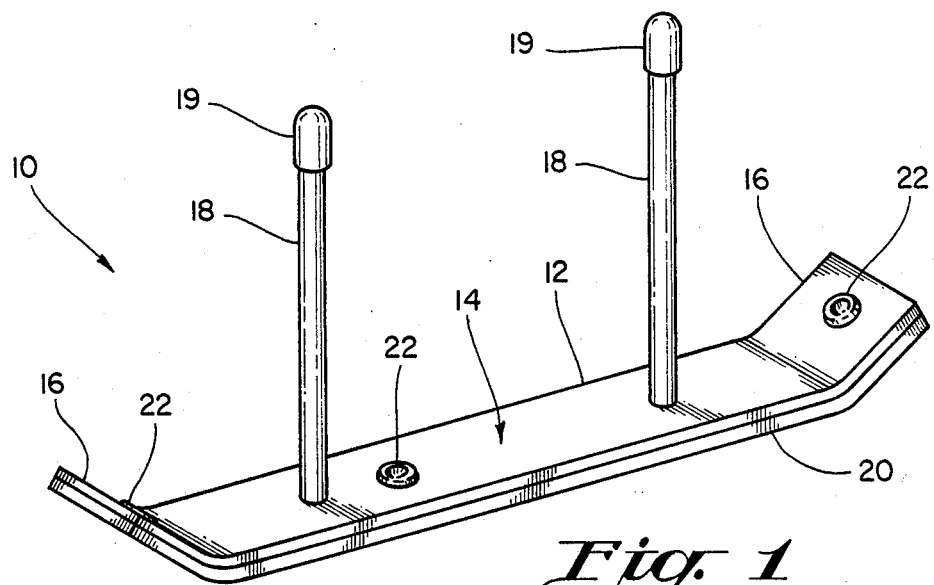
FIG. 1 is a perspective view of a leg support constructed in accordance with the principles of the invention.

Referring now to drawings, and initially to FIG. 1, there is illustrated an appliance leg support, designated generally by the reference numeral 10, constructed in accordance with the principles of the invention. The support 10 comprises a generally elongate base member 12 fabricated preferably from a suitable sheet steel stock. The base member 12 is formed with a generally flat center portion 14 and two upturned distal end portions 16. Preferably, each end portion 16 forms an angle of about 30° from the plane of the base member 12. Extending upwardly from the base member 12 are a pair of guide posts 18 having plastic end caps 19 removably attached to the ends thereof, the purpose of which will be explained, hereinafter. Secured to the underside of the base member 12 is a strip of anti-friction material 20, such as polythylene, for example. The strip 20 may be attached to the base member 12 by suitable rivets 22 such that the underside of the base member 12 is provided with a smooth lower surface having a relatively low coefficient of friction.

Figure 2:
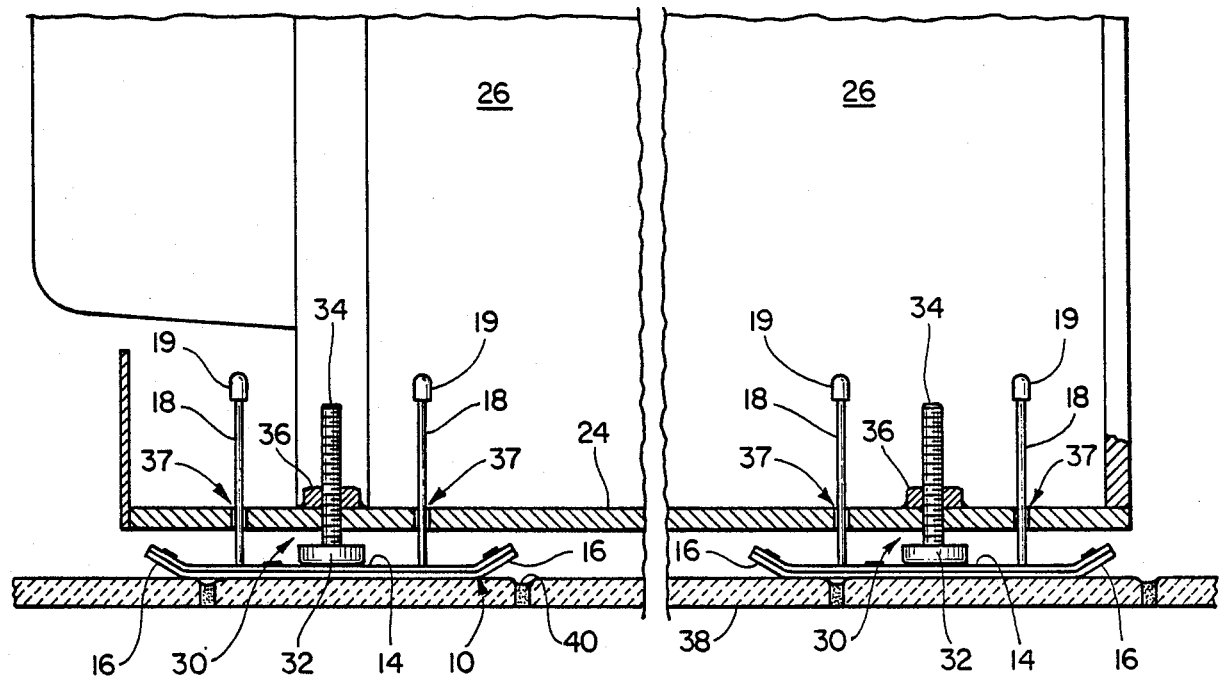
FIG. 2 is a fragmentary cross-sectional view of a kitchen appliance having the support of FIG. 1 installed thereon.

Turning now to FIG. 2, the support 10 can be seen as installed on a frame member 24 of a typical kitchen appliance, designated generally by the reference numeral 26. Generally, a typical appliance 26 is provided with legs 30 each of which comprises a disk-like pad member 32 secured to a threaded shaft 34. The shaft 34 is received by a suitable nut 36 fixed to the frame 24 of the appliance 26 such that manual adjustment of the leg 30 may be made to level the appliance 26 on an uneven floor. As installed, the support 10 is positioned such that the center portion 14 of the base member 12 is disposed in abutment with the pad member 32 of a leg 30, the pad member 32 bearing on the center portion 14 of the base member 12 when the appliance 26 is at rest on the floor. In order to stabilize the support 10 relative to the appliance leg 30, the upstanding guide post members 18 are inserted through slightly oversized apertures 37 provided in the appliance frame 24. The plastic end caps 19 when installed on the ends of the guide post members 18 prevent inadvertent removal of the supports 10 when the appliance 26 is lifted.

It can now be appreciated that a support 10 in accordance with the invention offers significant advantages in permitting an appliance 26 to be moved across a tiled floor. As seen in FIG. 2, a typical kitchen floor is illustrated comprising tiles 38 having grout lines 40 which are depressed relative to the surface of the floor. In practice, these grout lines 40 would pose an impediment to the movement of the appliance legs 30 across the floor when the position of the appliance 26 shifted. However, with the upturned end portions 16 of the base member 12 together with the layer of low-friction material 20 attached thereto, the support 10 glides freely over the grout lines 40 facilitating easy movement of the appliance 26. Moreover, the support 10 is so constructed as to allow ready accessibility to the appliance legs 30 in the event that adjustment of the pad height is desired. In addition, the novel construction of the posts 18 permits the support 10 to freely float relative to the appliance leg 30 while providing for the secure attachment of the support 10 to the appliance 26.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed as new and desired to be secured under Letters Patent of the United States is:

1. A support for a leg of an appliance having a frame member comprising:
    a thin generally elongate base member having a relatively flat center portion and two upturned distal end portions;
    guide means connected to said center portion of said base member for suspending said base member in floating fashion from said frame member;
    leveling means intermediate the frame and base members for adjusting the distance between said members when said appliance is resting on a floor; and,
    anti-friction means secured to the underside of said base member for sliding contact with said floor;
    wherein said guide means acts to align the longitudinal axis of said base member in the direction of intended movement of said appliance across said floor.

2. The support of claim 1 wherein the center portion of said base member provides the sole bearing surface of the leg of the appliance to the floor.

3. The support of claim 1 wherein means associated with said guide means is provided to prevent inadvertent support removal from the frame member when the appliance is lifted from the floor.

4. The invention of claim 1 wherein a plurality of such supports are spaced about the bottom of the appliance and wherein all of said supports are parallel and are elongated in a direction from front to back of the appliance.

5. The invention of claim 4 wherein each of said supports has means associated with its guide means to prevent inadvertent support removal from the frame member when the appliance is lifted from the floor.

* * * * *